May 6, 1969 G. PORTAL ET AL 3,443,094
SCINTILLATION OBSERVER FOR A SPECIMEN SUBJECTED TO RADIATION
Filed Nov. 22, 1966

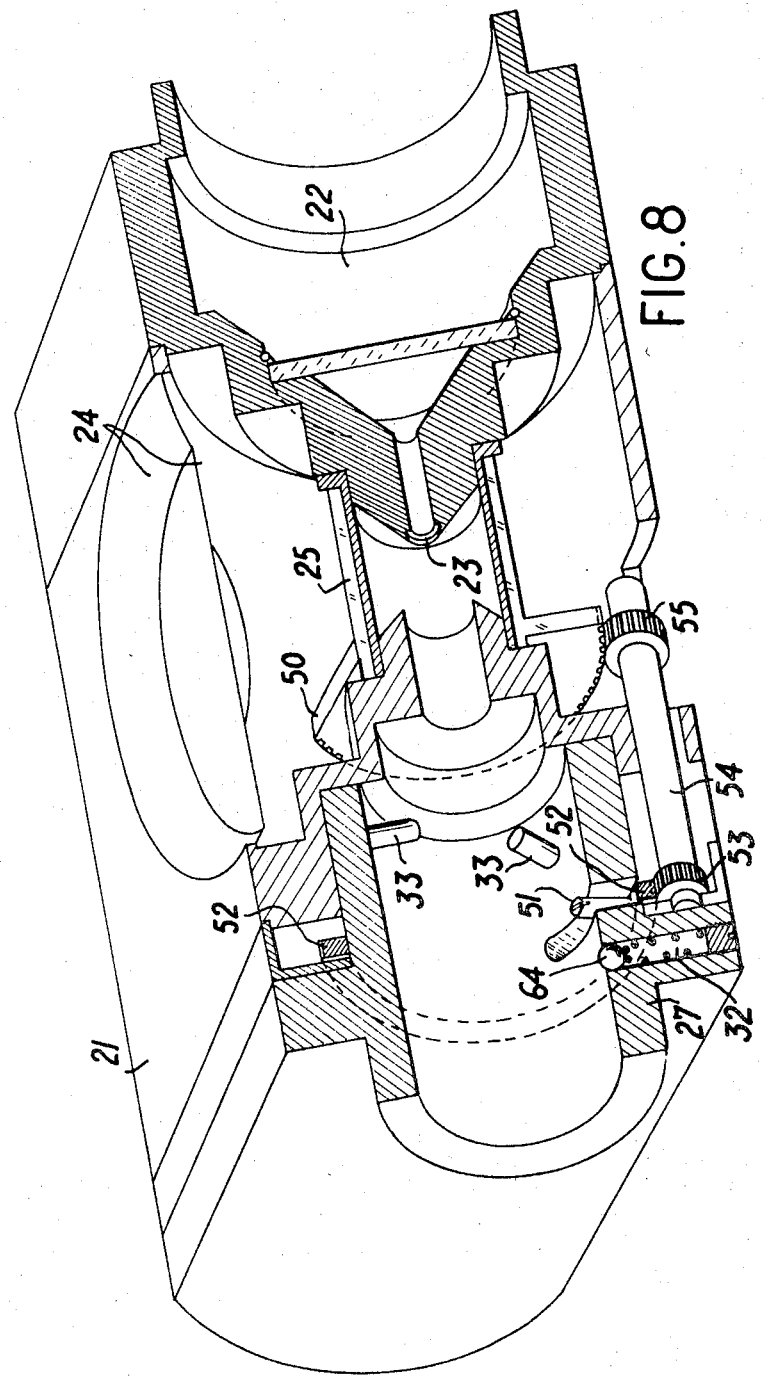

United States Patent Office 3,443,094
Patented May 6, 1969

3,443,094
SCINTILLATION OBSERVER FOR A SPECIMEN SUBJECTED TO RADIATION
Guy Portal, Epinay-sur-Seine, and Marc Aouizerate, Massy, France, assignors to Commissariat à l'Energie Atomique, Paris, France
Filed Nov. 22, 1966, Ser. No. 596,201
Claims priority, application France, Nov. 10, 1965, 41,863
Int. Cl. G01t 1/20; H01j 39/18
U.S. Cl. 250—71.5          8 Claims This invention relates to a device for observing the scintillation of a specimen, in particular of a dosimeter glass.

It is known that the scintillation of a specimen (such as, for example, a dosimeter glass) is observed by means of a detector unit comprising a detector proper (such as, for example, a photomultiplier) and a radiation source (such as, for example, a source of ultraviolet rays) between which the specimen to be studied is interposed.

In many cases, the specimen to be inspected is placed in position by means of ordinary tongs. However, this operation is both time-consuming and difficult if the specimen is of small size, which is particularly true in the case of dosimeter glasses.

The present invention makes it possible to simplify and shorten this positioning operation and is accordingly directed to a device for observing the scintillation of a specimen, said device being constituted on the one hand by a specimen-holding unit comprising a cylindrical casing, an axial cylindrical push-rod fitted in said casing and applied by means of a spring against the base of said casing, and a cylindrical chuck which is adapted to slide over said push-rod, said cylindrical chuck being adapted to hold a specimen to be studied and provided with a driving element so as to permit the sliding motion of said cylindrical chuck within said casing and, on the other hand, by a detector unit comprising a chamber for receiving said specimen-holding unit, a passageway which forms an axial extension of said chamber, a recess at the end of said passageway, a radiation source disposed in said recess, a detector proper, a window provided in a wall of the passageway opposite to said detector, a shutter for masking said window and a device for withdrawing said shutter at the moment of positioning of the specimen-holding unit within the receiving chamber, the specimen to be inspected which is carried by the terminal chuck of said holding unit being held in position in said passageway at the level of the window and applied against the adjacent seating of the radiation source under the action of said push-rod and said chuck being withdrawn at the same time as said shutter.

Other features and advantages of the present invention will become apparent from the following description in which two embodiments of the device according to the invention are given solely by way of indication without any limitation being implied.

Reference is made to the accompanying drawings, in which:

FIG. 8 shows a partial view in perspective of the detector unit which corresponds to the second embodiment.

Figure 1:
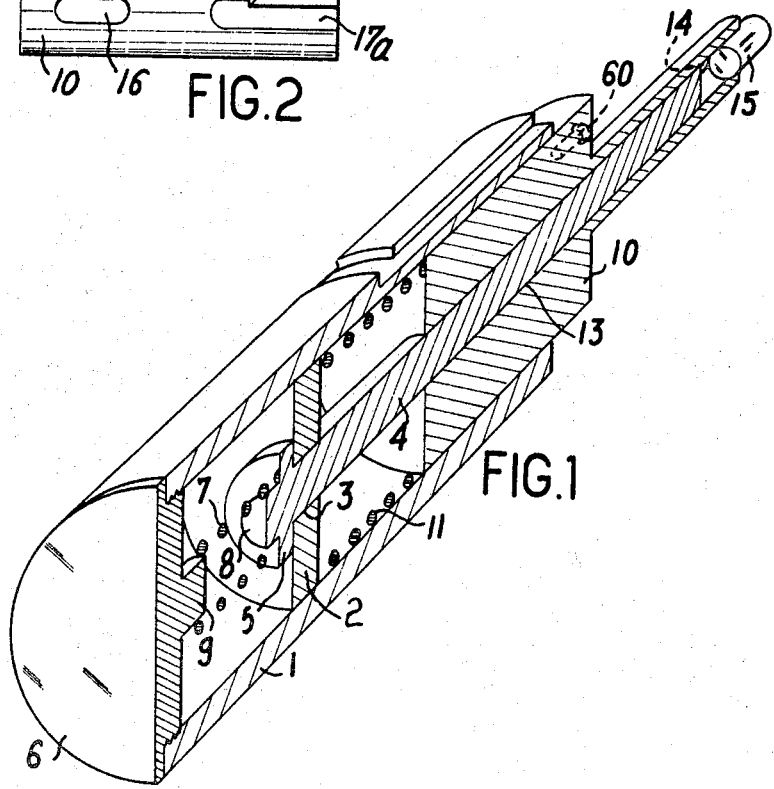
FIG. 1 is a view in perspective of the specimen-holding unit of the device according to the invention, this view being taken in cross-section on an axial plane.

There are shown in FIG. 1 a casing 1, a partition-wall 2 formed in said casing and a circular orifice 3 formed at the center of said partition-wall so as to provide a passageway for a push-rod 4 which terminates in a head 5. An end-cap 6 which is screwed onto the casing 1 serves as a support for a spring 7 which is guided by two lugs 8 and 9 and which applies the head of the push-rod 4 against the partition-wall 2. A slide-block 10 is adapted to penetrate into the casing 1. The coupling between these two members will become apparent from FIGS. 2 and 3. The slide-block 10 is maintained in the outwardly-extended position by a spring 11, a lug 60 being provided on that face of said slide-block which is located outside the casing 1. The side-block 10 has a tubular extension 12 and is pierced by a bore 13 which provides a pasageway for the push-rod 4. The terminal portion of the tube 12 is provided with two slits such as the slit 14 which provide flexibility of the tube end, and thus serves to hold a specimen 15 (such as, for example, a dosimeter glass), the scintillation of which is to be studied.

Figure 2:
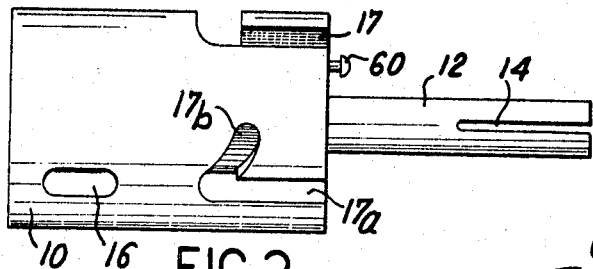
FIG. 2 is a profile view of the element employed to actuate the chuck of the specimen-holding unit and of the chuck itself.

FIG. 2 shows the slide-block 10, the tube 12, one of the slits 14 and the lug 60. The slide-block 10 is additionally provided with a first rectilineal groove 16 and three grooves 17 each comprising a rectilineal arm 17a and a helicoidal arm 17b and spaced at an angle of 120° relative to each other. Only two of the grooves referred to are visible in the figure. The tube 12 performs the function of a cylindrical chuck for the purpose of holding the specimen and the slide-block 10 is the element which serves to drive said chuck.

Figure 3:
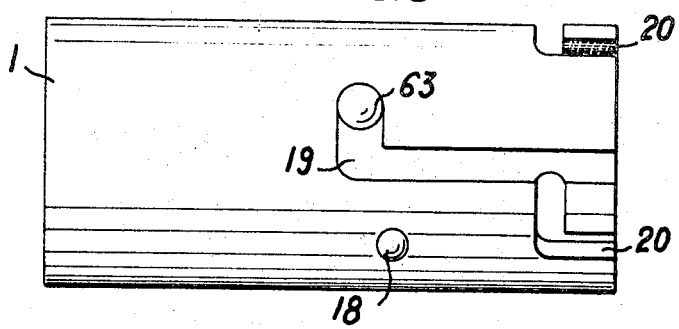
FIG. 3 is a profile view of the casing of the specimen-holding unit.

FIGURE 3 shows the casing 1 which is provided with a stud 18, an L-shaped groove 19 and a group of three L-shaped slots 20 which are spaced at an angle of 120° relative to each other but only two of which are shown in the figure. The arms of the slots 20 on the one hand and of the groove 19 on the other hand which are parallel to the edge of the casing are of equal length. The groove 19 is provided at its extremity with a circular recess 63.

Figure 4:
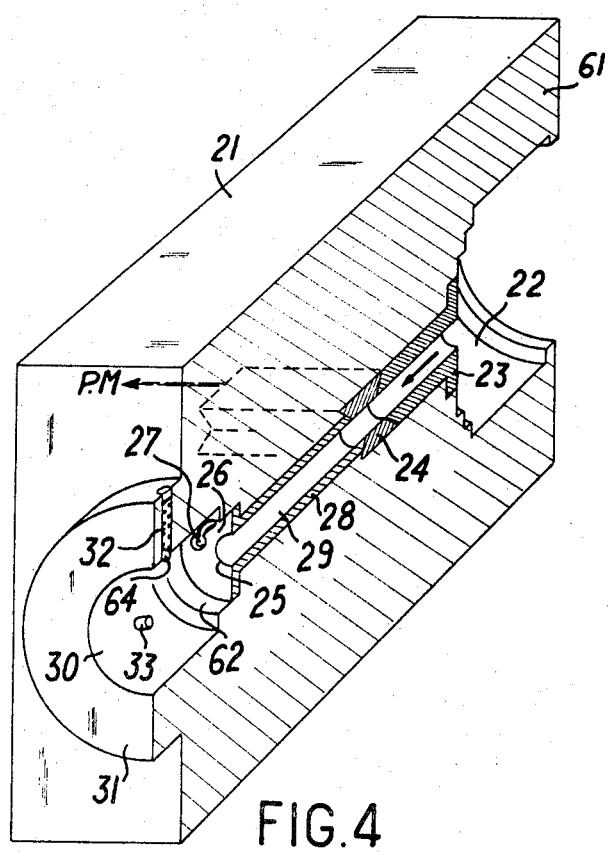
FIG. 4 is a partial view in perspective of the detector unit with which the specimen-holding unit is associated.

FIG. 4 shows a detector unit which corresponds to the specimen-holding unit of FIG. 1 (said detector assembly being, for example, a dosimeter reader). As shown in this figure, provision is made in a metal block 61 for a recess 22 which is intended to accommodate a radiation source (emitting ultraviolet radiation, for example), an impervious seating 23, a window 24, a detector proper which is not shown in the figure (for example, a photomultiplier) and which is placed behind said window, a shutter 25 for shielding said detector and formed of an annular flange 26 provided with a hole 27 and with a cylindrical tube 28 which is placed in a passageway 29, the function of said passageway being to provide a connection between the impervious seating 23 and a receiving chamber 30 which is intended to accommodate the specimen-holding unit. Said receiving chamber is machined in a boss 31 and is provided with an internal annular shoulder 62. The boss 31 is fitted with a tube 32 which terminates in a spring-loaded ball 64 and serves to guide the casing 1 and a group of three lugs such as the lug 33 which are spaced at an angle of 120° relative to each other and only one of which appears in the figure.

Figure 5:
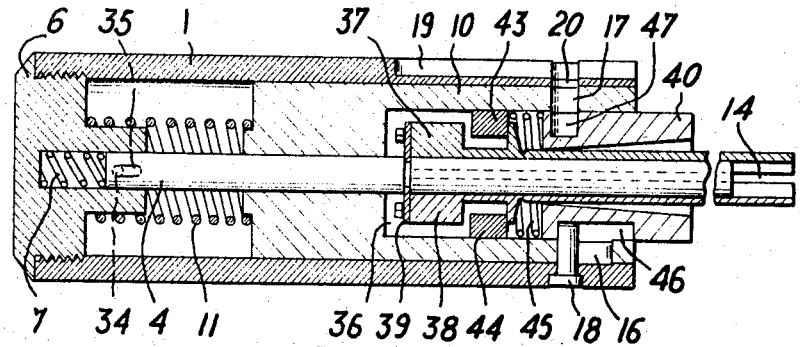
FIG. 5 is a sectional view of a second embodiment of the specimen-holding unit.

FIG. 5 and following illustrate a preferred alternative embodiment of the invention. FIG. 5 shows the casing 1, the slide-block 10, the stud 18, the slot 16, said stud and said slot being intended to provide a coupling between the casing 1 and the slide-block 10. There is additionally shown the push-rod 4 and the springs 7 and 11. The push-rod 4 is coupled to the end-cap 6 by means of a lug 34 which is slidably fitted in an elongated slot 35. The slide-block 10 is provided with a cylindrical recess 36 in which are adapted to penetrate two half-shells 37 and 38 held together by a flexible washer 39 and a sleeve 40 having a conical bore. A circular groove 41 or channel is formed in said two half-shells 37 and 38 and a corresponding circular ridge 42 is formed on the sleeve 40. Two half-rings 43 and 44 are screwed in the slide-block 10. A spring 45 is secured at one end to the half-rings 43 and 44 and at the other end to the sleeve 40. The coupling between the sleeve 40 and the slide-block 10 and consequently the casing 1 is effected by means of the stud 18 and a groove 46. Finally, there are also shown the groove 19, the slot 20, the slot 17 and a groove 47 which is formed in the sleeve 40.

Figure 6:
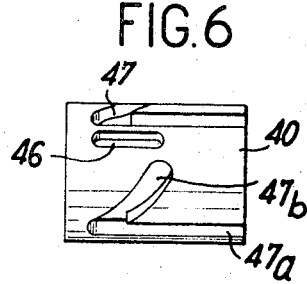
FIG. 6 is a profile view of the sleeve of the specimen-holding unit of FIG. 5.

In FIG. 6, there can be seen the sleeve 40, the groove 46 and two of the three grooves 47 which comprise a helicoidal arm 47b in the same manner as the grooves 17.

Figure 7:
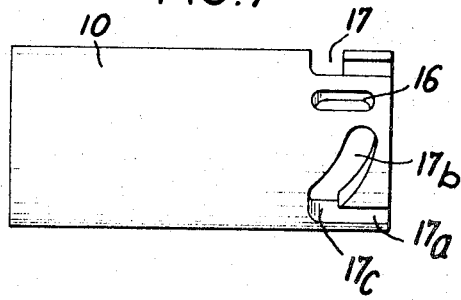
FIG. 7 is a profile view of the element employed to drive the specimen-holding unit of FIG. 5; and finally.

FIG. 7 shows the slide-block 10, the slot 16 and two of the slots 17 which are additionally provided in this embodiment with a second rectilineal arm 17c.

There is shown in FIG. 8 a detector unit 21 which corresponds to the second embodiment. This unit comprises the recess 22 which is provided for the radiation source, the impervious seating 23, the recess 24 of the detector proper (such as a photomultiplier) and the shutter 25 which serves to shield said detector. In this embodiment, said shutter is a portion of cylinder which is welded to a toothed sector 50 of 135°. The tube 32, the ball 64 and two of the three lugs 33 are again shown. As can also be seen from the figure, a lug 51 is coupled to a toothed wheel 52, said toothed wheel is adapted to engage with a pinion 53, said pinion is coupled by the shaft 54 to a second pinion 55 and said second pinion is adapted to engage with the toothed sector 50.

The operation of the first embodiment is as follows: the specimens to be inspected (such as, for example, a dosimeter glass 15) are assumed to be ranged in a rack provided with circular recesses for accommodating said specimens; the specimen-holding unit is placed above a specimen 15 to be inspected (the slits 14 being oriented downwards). The extremity of the tube 12 or terminal chuck opens out slightly so as to allow said specimen to pass through by virtue of the slits 14, then closes onto said specimen. The push-rod 4 performs the function of stop. The specimen-holding unit is then inserted in the receiving chamber 30 of the detector assembly. The specimen-holding unit is oriented in such a manner as to ensure that the tube 32 is capable of engaging in the presentation groove 19 of the casing 1. At the same time, the lugs 33 penetrate both in the slots 20 of the same casing 1 and in the grooves 17 of the slide-block 10 whilst the lug 60 engages in the hole 27 of the shutter 25. The specimen-holding unit is then inserted until the lugs 33 reach the corners of the slots 20. The lug 60 is then well engaged in the hole 27 and the tube 32 has also reached the corner of the groove 19. The specimen-holding unit is then rotated through an angle of 60° and the slide-block 10 is fast for rotation with the casing 1. In fact, the stud 18 of the casing 1 which is engaged in the longitudinal groove 16 of the slide-block 10 permits this latter alone to perform a movement of translation over a distance equal to the length of the specimen. The movement of rotation through an angle of 60° begins at the moment when the lugs 33 reach the corners of the grooves 17 and slots 20 which are juxtaposed when no compressive stress is exerted on the spring 11. When the lugs 33 slide simultaneously along the second arms of the grooves 17 and of the slots 20, the helicoidal arms 17b of the grooves 17 initiate a backward movement of the slide-block 10 relatively to the casing 1. The clearance which exists between the end of the head of the lug 60 and the annular flange 26 of the shutter 25 makes it possible by virtue of the simultaneous rotation of the specimen-holding unit and backward movement of the slide-block 10 for the lug 60 to engage immediately in the hole 27 of the shutter 25 and consequently to make this latter fast with the slide-block 10. The shutter 25 which shields the detector proper and which, in the position shown in the figure, was applied against the impervious seating 23, is therefore drawn back by the slide-block 10 and frees the window 24. At the same time, the tube 12 releases the specimen 15. Said specimen is thus located in front of the window 24 of the detector proper which is maintained in position between the push-rod 4 and the impervious seating 23 of the radiation source. The specimen is then in readiness for inspection. The specimen-holding unit is held in this position by the ball-lock system which is constituted by the tube 32, the ball 64 and the circular recess 63 of the groove 19. When the inspection is completed, the specimen-holding unit is caused to rotate in the opposite direction, the spring 11 which had been compressed during the preceding operation returns the slide-block 10 into its initial position, thereby reapplying the shutter 25 against the impervious seating 23 of the source, replacing the specimen 15 inside the cylindrical chuck 12 and then releasing the lug 60 from the hole 27. When the specimen-holding unit has been brought away from the detector unit, said specimen-holding unit is replaced above the specimen rack. Pressure is applied on the free face of the slide-block 10, thereby again compressing the spring 11 and freeing the specimen by means of the push-rod 4. The sole function of the spring 7 is to maintain the push-rod 4 in position and consequently the glass which is thus lightly applied against the impervious seating 23.

In the embodiment which is illustrated in FIGS. 5, 6, 7 and 8, the operation is as follows: the specimen-holding unit is placed above a specimen 15 to be inspected. Pressure is applied on the sleeve 40 in such a manner as to ensure that its ridge 42 penetrates into the channel 41 of the half-shells 37 and 38, thereby outwardly displacing the half-shells under the action of the flexible washer 39. As soon as pressure is no longer applied on the sleeve 40, the spring 45 again brings back the sleeve to its initial position. Said sleeve again exerts a pressure on the half-shells 37 and 38 which close onto the specimen 15. The specimen-holding unit is then introduced into the detector unit 21. The three lugs 33 penetrate into the triple set of slots and grooves: slots 20 of the casing 1, slots 17 of the slide-block 10 and grooves 47 of the sleeve 40. When the lugs 33 are located respectively in the corners of the three sets of slots and grooves, the specimen 15 is accordingly applied between the push-rod 4 and the impervious seating 23 of the radiation source. The specimen-holding unit is then caused to rotate through an angle of 60°. During the first 17°30′, the slide-block 10 remains motionless relatively to the casing 1 by virtue of the rectilineal arm 17c of the slot 17. Only the sleeve 40 is endowed with a backward movement relative to the casing 1. The ridge 42 of the sleeve 40 again penetrates into the channel 41 of the half-shells 37 and 38 and accordingly separates these latter. The movement of rotation is continued; the slide-block 10 is in turn endowed with a backward movement relative to the casing 1. Inasmuch as the angles of inclination of the sets of slots 47 and 17 are the same, the sleeve 40 is accordingly endowed with the same movement as the slide-block 10 and therefore appears to be motionless with respect to this latter, with the result that the ridge 42 is permitted to remain within the channel 41 and the half-shells 37 and 38 are consequently permitted to remain open. The longer travel of the sleeve 40 is made possible by the fact that the slot 46 is longer than the slot 16. The slide-block 10 is accompanied in its backward movement by the half-rings 43 and 44, thereby freeing the specimen 15.

At the same time, as soon as the specimen-holding unit has engaged in the detector unit 21 after the locking member 32 of said detector unit has penetrated into the presentation groove 19, the lug 51 also penetrates therein and carries out the same movement of rotation as the specimen-holding unit. By means of the set of pinions 52, 53, 55, the lug 51 actuates the toothed sector 50 and consequently the shutter 25, thereby disengaging the detector proper and therefore permitting inspection of the specimen. When the inspection is completed, the specimen-holding unit is rotated in the opposite direction, the shutter 25 again masks the detector proper. In addition, under the action of the spring 11, and progressively as the lugs 33 are released from the slots and grooves, the slide-block 10 and consequently the half-shells 37 and 38 as well as the sleeve 40 carry out a translational movement in the direction opposite to that which was previously effected. The translational movements referred-to are initially parallel, thereby maintaining the half-shells 37 and 38 in the open position and having the effect of replacing the ends thereof on each side of the specimen 15. When the lugs 33 reach the rectilineal arms 17c of the slots 17 of the slide-block 10, said slide-block comes to a standstill whilst the sleeve 40 continues to perform its movement of translation under the action of the spring 45. The ridge 42 passes out of the channel 41 and again bears on the half-shells 37 and 38, which thus close onto the specimen 15. The specimen-holding unit can then be withdrawn from the detector unit 21.

The specimen inspection device in accordance with the invention is very simple to use. The presentation of the specimen is carried out each time both rapidly and accurately. No handling of dosimeter glasses is called for, thus avoiding any fluorescent traces of urea and consequently providing better reproducibility of results. The method adopted for securing the specimen permits of full exploitation of this latter. The specimen inspection device in accordance with the invention additionally provides for operation of the shutter 25 which shields the detector proper and accordingly increases the service life of this latter by virtue of the fact that no excitation occurs between readings.

What is claimed is:

1. A device for observing the scintillation of a specimen, said device comprising a specimen-holding unit constituted by a cylindrical casing, an axial cylindrical push-rod fitted in said casing and applied by means of a spring against the base of said casing, and a cylindrical chuck which is adapted to slide over said push-rod, said cylindrical chuck being adapted to hold a specimen to be studied and provided with a driving element so as to permit the sliding motion of said cylindrical chuck within said casing and a detector unit comprising a chamber for receiving said specimen-holding unit, a pasageway which forms an axial extension of said chamber, a recess at the end of said passageway, a radiation source disposed in said recess, a detector proper, a window provided in a wall of the pasageway opposite to said detector, a shutter adapted to mask said window and a device for withdrawing said shutter at the moment of positioning of the specimen-holding unit within the receiving chamber, the specimen to be inspected which is carried by the terminal cylindrical chuck of said holding unit being held in position in the passageway at the level of the window and applied against the adjacent seating of the radiation source under the action of said push-rod and said cylindrical chuck being withdrawn at the same time as said shutter.

2. A device according to claim 1, wherein said driving element for actuating the cylindrical chuck is constituted by a slide-block which is integral with the chuck, said slide-block being traversed by the push-rod and applied by means of a spring against the base of the casing.

3. A device according to claim 2, wherein said slide-block and the receiving chamber are provided with actuating and locking means of the bayonet-coupling type so as to effect the withdrawal of the cylindrical chuck and of the shutter when the specimen is placed in position on its seating.

4. A device according to claim 1, wherein the shutter is of tubular configuration and adapted to withdraw axially, and the device for effecting the movement of withdrawal of the shutter is constituted by an annular shoulder of said tubular shutter which is secured to the chuck-actuating element by means of a groove and lug system of the bayonet-coupling type.

5. A device according to claim 1, wherein the chuck-actuating element is constituted by a slide-block which is adapted to slide over the internal cylindrical surface of the casing and which is provided with a cylindrical recess for accommodating a sleeve with a conical bore traversed by the cylindrical chuck which is maintained in the closed position by a ridge of the sleeve corresponding to the small section of the bore, said ridge being caused to engage in a circular channel of the cylindrical chuck as a result of a movement of displacement of the sleeve within the slide-block towards the base of said chuck which is thus permitted to open under the action of a flexible member, said sleeve being made fast with the chuck and with the slide-block as it continues to perform its axial movement by means of an annular shoulder of the chuck which bears on an annular bearing surface of said slide-block.

6. A device according to claim 1, wherein the shutter is constituted by a portion of tube which is movable in rotation and the device for effecting the movement of withdrawal of the shutter consists of a gear-type transmission system actuated by a lug which is driven by said actuating and locking means of the bayonet-coupling type.

7. A device according to claim 1, wherein said radiation source is an ultraviolet-ray source.

8. A device according to claim 1, wherein said detector is a photomultiplier.

References Cited

UNITED STATES PATENTS 3,283,152  11/1966  Yokota et al. _____ 250—71.5

250—71, 83

RALPH G. NILSON, *Primary Examiner.*

MORTON J. FROME, *Assistant Examiner.*

U.S. Cl. X.R.